United States Patent [19]
Smidt et al.

[11] Patent Number: 5,995,610
[45] Date of Patent: Nov. 30, 1999

[54] COOPERATIVE CALL PROCESSING ACROSS PUBLIC AND PRIVATE INTELLIGENT NETWORKS

[75] Inventors: Allan Smidt, Broenshoej; Jan H. I. Lindeberg, Nivaa, both of Denmark; Peter Hammarström, Sandviken, Sweden

[73] Assignee: Telefonaktiebolaget LM Ericsson, Stockholm, Sweden

[21] Appl. No.: 08/852,024

[22] Filed: May 6, 1997

[51] Int. Cl.[6] .................................................. H04M 3/42
[52] U.S. Cl. ........................................... 379/207; 379/220
[58] Field of Search ................................... 379/201, 207, 379/230, 219, 220

[56] References Cited

U.S. PATENT DOCUMENTS

| | | | |
|---|---|---|---|
| 5,282,244 | 1/1994 | Fuller et al. | 379/230 |
| 5,420,916 | 5/1995 | Sekiguchi | 379/230 |
| 5,452,350 | 9/1995 | Reynolds et al. | 379/230 X |
| 5,526,413 | 6/1996 | Cheston, III et al. | |
| 5,526,415 | 6/1996 | Wakamoto | |
| 5,537,470 | 7/1996 | Lee | |
| 5,583,927 | 12/1996 | Ely et al. | |
| 5,640,446 | 6/1997 | Everett et al. | 379/230 X |
| 5,838,782 | 11/1998 | Lindquist et al. | 379/230 |
| 5,852,660 | 12/1998 | Lindquist et al. | 379/207 X |

FOREIGN PATENT DOCUMENTS

| | | |
|---|---|---|
| 0 142 004 | 5/1985 | European Pat. Off. |
| 0 358 408 A2 | 3/1990 | European Pat. Off. |
| 0 478 206 A2 | 4/1992 | European Pat. Off. |
| 0 647 051 | 4/1995 | European Pat. Off. |
| 0 707 406 | 4/1996 | European Pat. Off. |
| 0 717 570 A2 | 6/1996 | European Pat. Off. |
| 0 726 682 | 8/1996 | European Pat. Off. |
| 0 726 682 A2 | 8/1996 | European Pat. Off. |
| 42 12 102 A1 | 11/1992 | Germany |
| 4 441 753 | 6/1995 | Germany |
| 93/16574 | 8/1993 | WIPO |
| 96/04754 | 2/1996 | WIPO |
| 96/14704 | 5/1996 | WIPO |
| 96/19904 | 6/1996 | WIPO |
| 96/38018 | 11/1996 | WIPO |

OTHER PUBLICATIONS

*Telecommunication Journal of Australia*, vol. 46, No. 3, 1996, pp. 13–18, XP002048699, John Damrow et al., "The Intelligent Network Call Centre".

*Annual Review of Communications*, vol. 46, Jan. 1, 1992, pp. 619–625, XP000321976, R.W. Petrunka, "Exchange Access & Operator Services in AIN".

*Annual Review of Communications*, vol. 46, Jan. 1, 1992, pp. 491–495, XP000321961, E. Bonkowski, "An End User's Expectations of the Advanced Intelligent Network".

(List continued on next page.)

*Primary Examiner*—Creighton Smith
*Attorney, Agent, or Firm*—Nixon & Vanderhye P.C.

[57] ABSTRACT

A wide range of advanced call processing services are optimally provided through a cooperative effort between public and private intelligent networks. Service control logic in the public network interacts with service control logic in the private network. The cooperative call processing exploits the best service features from both environments. More specifically, a logical relationship is established over an end-to-end, service logic communication path between the service control elements of both networks using a very small set of operation procedures. Using that set of operational procedures, either network's service control logic requests and receives a service feature orchestrated entirely by the other network's service logic. In this way, specific service features making up a requested service may be provided by the network best suited to perform a particular service feature. Since neither network needs to control or even know how the other network performs its assigned service feature, the integrity and simplicity of each network's control logic and protocols are preserved.

33 Claims, 6 Drawing Sheets

OTHER PUBLICATIONS

*Globecom 89*, Fung, "Defining intelligent network services in a multivendor distributed environment," vol. 2, Nov. 27, 1989, Dallas, Texas, US, pp. 132–136, XP000145739.

*British Telecommunications Engineering*, vol. 14, Jul. 1995, pp. 98–105, Andrew Catchpole et al., "Introduction to Computer Telephony Integration".

*International Switching* Symposium, Oct. 25–30, 1992, Yokohama, Japan, vol. 2, pp. 34–38, Ingeborg Graetz et al., "IN and CSTA—two sides of the same coin?".

*BYTE*, Sep. 1995, pp. 201–207, James Burton, "Standard Issue".

*Hewlett Packard Technical Data*, "Applied Computerized Telephony (ACT)".

*Ericsson Product Overview*, Ericsson Business Networks AB 1996, EN/LZT 102 2389 RA, pp. 5–27, "MD110 ApplicationLink for CSTA 2.0".

COOPERATIVE CALL PROCESSING ACROSS PUBLIC AND PRIVATE INTELLIGENT NETWORKS

RELATED APPLICATIONS

This application is related to two commonly-assigned patent applications entitled "CTI Gateway in Intelligent Network" (attorney docket no. 1410-314) and "Computer Telephony Integration Gateway" (attorney docket no. 1410-315), the disclosures of which are incorporated herein by reference.

FIELD OF INVENTION

The present invention relates generally to telecommunication services, and more particularly, to interaction between intelligent network architecture components.

BACKGROUND AND SUMMARY OF THE INVENTION

Both public and private (business) telecommunications environments employ intelligent network techniques to develop and process advanced telecommunication services. Intelligent network services are based upon a network architecture containing a collection of communicating "archetype" elements for handling (a) service management, (b) service control, (c) service data, (d) service information, and (e) switching control. These archetype elements may be identified in both the public and the private telecommunications environments. A service control element may, for example, be employed in a Service Control Point (SCP) in a public intelligent network and in a Application Server for Computer Telephony Integration (CTI) in a private intelligent network. Likewise, a service information element may be an Intelligent Peripheral (IP) in public networks while private networks may use the term Media Server. A service data element is typically some sort of database.

For both environments, the processing of a call attempt in a switching control element may trigger service processing in a service control element. The service control element then sequences and controls instrumentation functions in service data, service information and/or switching control elements to advance the call attempt through the specific service features of the triggered service. Service data elements maintain network and/or customer data required for service processing. Service information elements provide a mechanism for exchanging information between call parties and the network during service processing. Switching control elements establish, supervise, maintain, and release a transport path between two or more call parties or between a call party and a service information element under the control of the service control element.

Unfortunately, the operation procedures and protocol stacks used to interconnect intelligent network elements are not coordinated across the public and private intelligent network domains. Elements of a public intelligent network communicate via operation procedures and protocol stacks that are specific to public telecommunication standards. On the other hand, private intelligent network operation procedures and protocols are based on computer industry standards. Because public telecommunication standards and computer industry standards are different, the set of operation procedures used to accomplish a service feature in a particular intelligent network is specific to that network and is implemented entirely within the boundaries of that specific network.

As a result of the communication incompatibility between public and private intelligent networks, a service control element in one type of intelligent network cannot directly request performance of a service feature by a service control element in another type of network. None of the existing service control elements in either network environment provides simultaneous support of operation procedures for service data, service information, and switching control elements both in its own network and in other types of networks. Indeed, the complexity and cost of a service control element that would provide such simultaneous support would be significant.

In order for a public intelligent network provided service to request a service feature from a private intelligent network, it must transmit a call attempt to the switching control element of the private intelligent network. However, this type of switch-routed service request procedure is indirect and inefficient. Moreover, this indirect triggering of service processing via an internetwork call attempt is required in the opposite direction when a service control element in a private intelligent network desires a call processing service from the public intelligent network. Although switching control elements and the standardized telephony signaling system handle telephony traffic intranetwork call processing quite well, this switch-based approach to call processing does not permit direct exchange of information between service control elements in public and private intelligent networks.

Such telephony, switch-based internetwork call processing is referred to herein as "confined Call Processing" because each network's service control elements render requested services without interacting with the other network's service control elements. Confined call processing does protect the integrity of both types of networks in the sense that the service control logic of one network type is not able to interfere with or otherwise take control of the other network's resources while performing a call processing service. But confined call processing is not the most efficient and effective way for intelligent networks to request and provide services to each other. For example, existing switching control elements and transport signaling systems cannot forward detailed service context information from the requesting service control element to the serving service control element or return an intermediate or final service feature result information from the serving to the requesting service control element.

The practical effect is that confined call processing ignores the benefits of direct interaction between service control elements and resources of different network types optimized for specialized capabilities or for the technology of a specific telecommunications environment in rendering advanced call processing services that usually include multiple service feature requests. For example, some private intelligent network developers have been able to rapidly customize advances in computer information technology to create new private intelligent network service features. However, because there is no way to establish a direct, service level control relationship between the service control elements of the private and public intelligent networks, the public intelligent network services do not have access to and therefore do not benefit from such new private intelligent network customized service features.

The absence of a logical service control relationship between public and private networks also adversely limits private intelligent networks. A private intelligent network service instance applying confined call processing to a call request from a public intelligent network service cannot return dynamic, mid-service billing information to a billing record for the call maintained by the public intelligent network service. Nor can the private intelligent network return information to the public intelligent network to complete the originating call to a network destination. Instead, in order to complete the call to the destination, another independent call connection must be established and maintained. In this case, confined call processing leads to a transport path that is "tromboned" through the switching control element of the private intelligent network. For example, a subscriber requests a first service feature through a call request routed through the switching element of the private intelligent network. If the subscriber desires that, after the first service feature is rendered, the call be completed to another destination in the public network, i.e., a second feature of the requested service, the private network has no way to perform that second service feature except by placing a second switch-based call from the private switch element to the public switch element. The double-back transport path through the switch forms the "trombone."

The present invention solves the problems of confined call processing by providing a "Cooperative Call Treatment" approach where a call is logically serviced effectively and efficiently across the boundaries of public and private intelligent networks without undermining the integrity of each network. The service logic level cooperation enables service features of the call optimally or otherwise provided by and processed within a public intelligent network to call upon and cooperate with service control features of the call provided by and processed within a private intelligent network and vice versa.

Cooperative call processing is accomplished using a set of operation procedures shared between the service control elements of the public and private intelligent networks. In addition, a "protocol stack bridge" enables these operation procedures to be carried on top of standard protocol stacks used in both the telecommunication industry and the computer industry. The protocol stack bridge is used when the lower layers of these protocol stacks are incompatible. Advantageously, the protocol stack bridge may be realized using existing technology and is fully transparent to the format and encoding of the operation procedures that the bridge relays.

Therefore, the present provides a method of logically integrating services from a public network oriented towards a telephony protocol with services from a private intelligent network oriented towards a computer industry protocol. An end-to-end communication connection is established between the public intelligent network service logic and the private intelligent network service logic. Upon receiving a telecommunications call on one of the networks for a call processing service having plural service features, the public intelligent network service logic and the private intelligent network service logic cooperatively perform the plural service features.

A significant aspect of the invention is that the public intelligent network service logic and the private intelligent network service logic interact with each other while cooperatively performing the plural service features. Another significant advantage of the present invention is that when one of the network's service logic requests the other network's service logic to perform one of the service features, the one network's service logic does not control how the other network's service logic performs the requested service feature. In this way, the present invention preserves the integrity of each network, e.g., the private network service logic cannot directly access the public network billing records. In fact, the two networks do not have to have any knowledge of how the other network service logic performs the requested service feature.

The cooperative performance and interaction between the service logic of the two networks is implemented using a common set of operation procedures transmitted over the established service logic end-to-end communication connection. One operation procedure includes a Start operation coupled with a specific service feature start argument. When the Start operation is transmitted by the service control logic of one network over the established end-to-end communication connection to the other network's service logic, the other network's service logic performs the requested service feature and returns a Continue operation coupled with a specific service feature result argument over the established end-to-end communication connection. After the service feature result is returned, a determination is made if further servicing is needed to provide the requested service feature. If so, a Continue operation coupled with a specific service feature Continue argument is sent to the other network's service control logic to continue service feature processing by the other network's service control logic. Otherwise, a Stop operation coupled with a specific service feature stop argument is sent to the other network's service control logic. The operation procedures also include an Event operation coupled with a specific service feature event argument for transmitting one or more events that the other network's service control logic is to take into account when providing the requested service feature.

The present invention also provides for an integrated communications services system including a public intelligent network oriented towards a telephony protocol and providing services and a private intelligent network oriented towards a computer industry protocol and providing a second set of services. A communications path is established between the service logic in the public intelligent network and the service logic in the private intelligent network. A set of operational procedures is used by the service logic in both networks to interact at a logical operation level. When a telecommunications call is received from the one of the networks requesting a call processing service having plural service features, the service logic of both networks cooperatively performs the service features by invoking the operational procedures over the communications path, i.e., the Start, Continue, Stop, and Event operations, along with specific service feature arguments. The service logic of the network that received the telecommunications call identifies the various service features to be performed in order to fulfill the call service and determines which of the two networks is to perform each of the identified service features. After receiving a service feature request framed using one of the operational procedures and transmitted over the communications path, the other network service logic performs the requested service feature and returns a result over that communications path.

Additional objects, advantages, and novel features of the present invention will be set forth in part in the description which follows, and in part will become apparent to those skilled in the art upon examination of the following, or may be learned by practicing the invention.

DETAILED DESCRIPTION

In the following description, for purposes of explanation and not limitation, specific details are set forth, such as particular embodiments, elements, interfaces, hardware configurations, data structures, software flows, techniques, etc. in order to provide a thorough understanding of the present invention. However, it will be apparent to one skilled in the art that the present invention may be practiced in other embodiments that depart from these specific details. In other instances, detailed descriptions of well known methods, devices, and elements are omitted so as not to obscure the description of the present invention with unnecessary detail.

Figure 1:
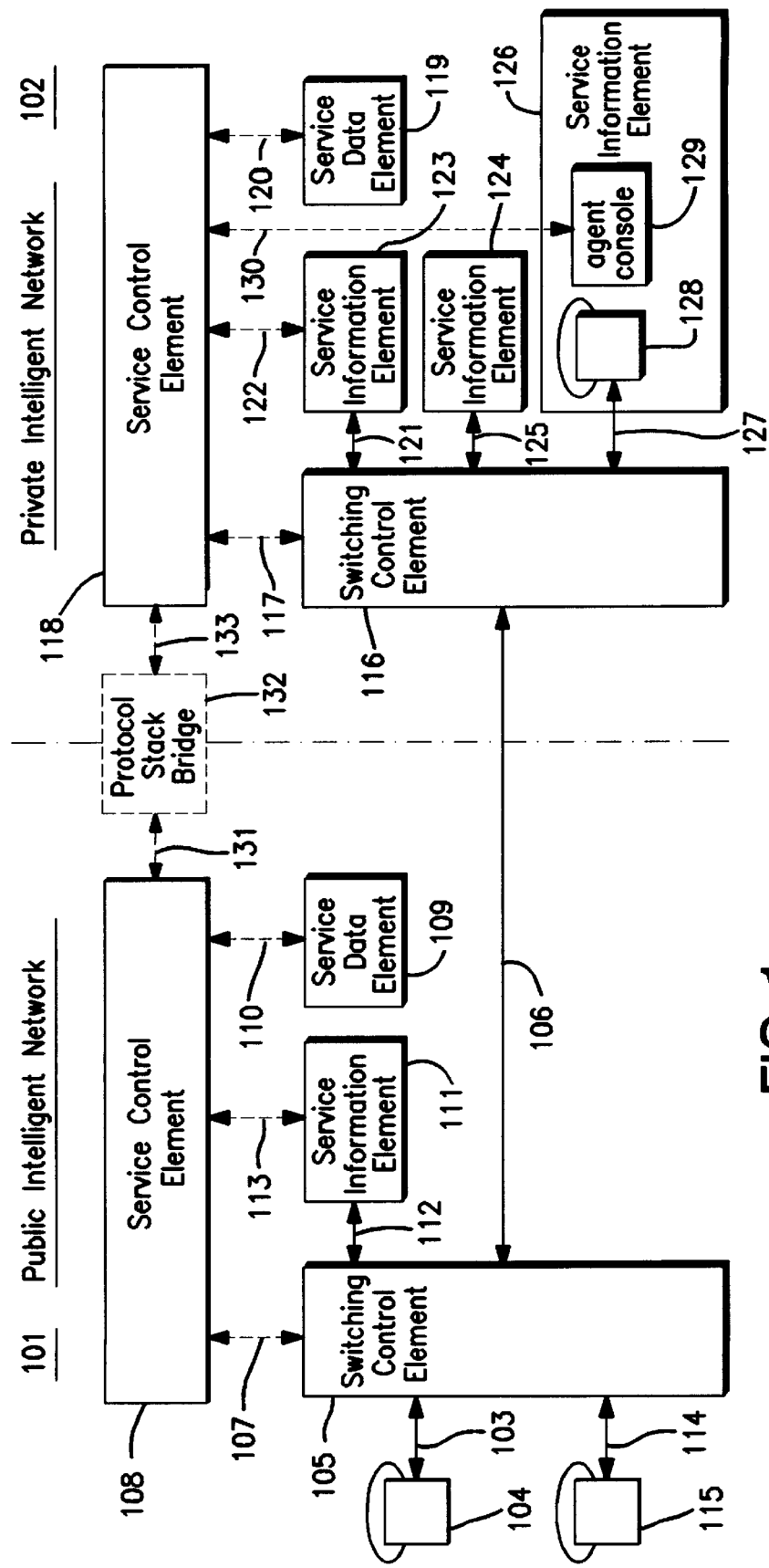
FIG. 1 illustrates a switch-based interconnection of intelligent network elements within the boundaries of public and private telecommunications environments and interconnection of service control elements across boundaries of those environments in accordance with an example, non-limiting embodiment of the present invention.

FIG. 1 illustrates basic interconnections of archetype elements within and across a public intelligent network 101 and a private intelligent network 102. The two networks are separated by a dot-dashed line. Solid double-ended arrows depict transport (in-band signaling) connections while dashed double-ended arrows depict control (out-of-band signaling) connections. However, the out-of-band signaling for establishing, maintaining, supervising, and releasing transport connections are assumed to be carried within the transport connections themselves.

The archetype elements used to describe the invention may be mapped onto a collection of physical nodes found in a standard Intelligent Network (IN). Similar mappings may also be made for other types of intelligent networks. The service control element may correspond to an IN Service Control Point (SCP), the switching control element may correspond to an IN Service Switching Point (SSP), the service data element may correspond to an IN Service Data Point (SDP), and the service information element may correspond to an IN Intelligent Peripheral (IP). This collection of IN nodes may be fully networked using Signaling System No. 7 based transport and control connections.

Transport connection 103 between telephone terminal 104 and public intelligent network 101, as well as transport connection 106 between public intelligent network 101 and private intelligent network 102, may furthermore be switched through for example a Public Switched Telephone Network (PSTN). The illustrated elements do not necessarily represent all of the physical nodes used to realize an intelligent network as will be appreciated by those skilled in the art.

For better understanding of cooperative call processing in accordance with the present invention, it will be helpful initially to describe a confined call processing method for handling a public intelligent network originated call with the objective of connecting (completing) that call to a public intelligent network destination. It is assumed that the calling party initiates the call from telephone terminal 104 to public intelligent network 101 over transport connection 103. The call receives public intelligent network processing when switching control element 105 detects a trigger condition during, for example, analysis of the dialed digits. In response to the detected trigger, switching control element 105 launches a request procedure for directions related to further switching processing of the call via control connection 107 towards service control element 108.

Service control element 108 invokes a service processing instance for the call and selects the service logic to be processed based on call attributes received from switching control element 105. In order to obtain further information required to fulfill the switching control element's request for switching directions, the service logic may access service data element 109 via control connection 110. The service logic may also advance the call attempt by directing switching control element 105 to connect the call to a public intelligent network provided user interaction resource in order to send and/or collect information from the caller.

Automated processing of user interaction parts of a service may be accomplished from service control element 108 by first directing switching control element 105 to connect the incoming call to, for example, an interactive voice response device in service information element 111 via transport connection 112 and then directing service information element 111 via control connection 113 to start the proper logic for automated interaction with the caller. When the user interaction is completed, any information collected from the caller and/or produced by the user interaction logic is returned for service logic processing via control connection 113 and may be used for further processing of the call. The service logic may, for example, apply additional billing if the caller received value added information during the user interaction. This additional billing information is collected in a billing record maintained for the call by public intelligent network 101.

The switching control element 105 disconnects transport connection 112 from the incoming call, either based on out-of-band signaling received on transport connection 112 from service information element 111 or on commands received on control connection 107 from service control element 108. Assuming that the service logic gathers the information required for completing the incoming call to its proper destination, service control element 108 then directs switching control element 105 to establish an outgoing call on transport connection 114 towards telephone terminal 115 and to connect the incoming and outgoing sides of the call.

In this confined call processing example, the call is processed exclusively within public intelligent network 101. For the duration of the call between telephone terminals 104 and 105, public intelligent network 101 maintains one billing record and occupies two circuits in switching control element 105. The billing and post-processing system finds both call duration charges and total additional service charges in the single billing record.

A more complicated example of confined call processing employs call processing both in the public intelligent network 101 and the private intelligent network 102. Assume that some service logic processing following the user interaction service described above requires access to a user interaction service feature provided by the private intelligent network 102 in order to establish the final destination for the call. Further assume that the service logic contains enough information available to establish an outgoing call towards a private network destination terminating on switching control element 116 and that arrival of this outgoing call at switching control element 116 invokes processing of the expected user interaction service feature. In order to advance the incoming call towards private intelligent network 102, the service control element 108 directs the public intelligent network switching control element 105 to establish an outgoing call on transport connection 106 towards the private intelligent network switching control element 116 and to connect the incoming and outgoing sides of the call.

The private intelligent network 102 therefore receives an incoming call attempt for a private intelligent network service (the first switched call). More specifically, switching control element 116 detects a trigger condition during analysis of call attributes received by out-of-band signaling on transport connection 106 from the public intelligent network switching control element 105. In response to the trigger occurrence, the private intelligent network switching control element 116 launches a request procedure for instructions related to further switching processing of the call via control connection 117 towards the private intelligent network service control element 118.

The private intelligent network service control element 118 invokes a service processing instance for the call and selects the service logic to be processed based on call attributes received from private intelligent network switching control element 116. In order to obtain further information required to fulfill the request for switching directions, the service control element logic may access the private intelligent network service data element 119 via control connection 120. The service logic may also advance the call attempt by directing the private intelligent network switching control element 116 to connect the call to a private intelligent network user interaction resource in order to send and/or collect information from the caller. Any automated processing of user interaction response within the private intelligent network 102 may be accomplished, as described above for public intelligent network 101, using transport connection 121 and control connection 122 to access and control from service information element 123.

The service logic may also apply automated user interaction by directing private intelligent network switching control element 116 to connect the incoming call to a stand-alone service information element 124 via transport connection 125. This element only provides confined call processing in the absence of a control connection to/from service control element 118. Service information element 124 is controlled only via the limited capabilities provided by out-of-band signaling on transport connection 125.

Service logic in the private intelligent network 102 may also apply agent-assisted user interaction by means of one or more agent positions contained in service information element 126. Switching control element 116 is directed to connect the incoming call to agent telephone terminal 128 via transport connection 127. Relevant call and/or service attributes are displayed on the agent console via control connection 130 to permit the agent to intelligently interact with the caller.

When a user interaction part is completed, any information collected from the caller and/or produced by service information element 123 or 126, may be returned to service logic processing via control connection 122 or 130 and may be used for further processing of the call. The service logic may, for example, apply additional billing if the caller received value-added information during a user interaction service. This additional billing information is collected in the billing record maintained for the call by private intelligent network 102 which cannot be included in the billing record maintained by public intelligent network 101 for the original call.

Using the above-described methods, the private intelligent network service control logic gathers the information required for completing the incoming call to its proper destination in public intelligent network 101. The private intelligent network service control element 118 then directs the private intelligent network switching control element 116 to establish an outgoing call (the second switched call) for that destination on transport connection 106 towards switching control element 105 of public intelligent network 101 and to connect the incoming side (the first switched call) and outgoing side (the second switched call) thereby generating a "tromboned" call. If call duration charges are applied in the private intelligent network 102, they are included in the billing record maintained for the tromboned call by private intelligent network 102. However, these charges cannot be included in the billing record maintained by public intelligent network 101 for the original call.

In addition to the clear disadvantage of the public intelligent network 101 treating the second switched call as a "new" call, the second switched call is not related (1) to the original incoming call from telephone terminal 104 or (2) to the original first call to the private intelligent network 102. Depending on whether switching control element 105 detects a trigger condition for the returned call, the returned call may or may not receive additional Confined Call Processing from the public intelligent network 101. In any case, switching control element 105 establishes an outgoing call on transport connection 114 towards telephone terminal 115 and connects the incoming and outgoing sides of this new call. A new billing record for call duration charges and eventual additional billing information is also created in public intelligent network 101.

In the above examples of confined call processing, call requests are processed independently within both public intelligent network 101 and private intelligent network 102. The service control elements do not cooperate or interact. For the duration of the call between telephone terminals 104 and 105, the public intelligent network 101 maintains two billing records and occupies four circuits in switching control element 105, while private intelligent network 102 maintains one billing record. Moreover, the call occupies two circuits in switching control element 116. In addition to this inefficient use of resources, the post-processing billing systems of both public and private networks must be able to correlate all three billing records in order to establish total call duration charges and total additional service charges for the call.

For the cooperative call processing approach of the present invention a cooperative and direct relationship is established between public network service control element 108 and private network service control element 118. This direct control relationship allows calls to be cooperatively treated using the service features designed and processed within public intelligent network 101 along with the service features designed and processed within private intelligent network 102. In this way, service features from both networks may be incorporated in the design of intelligent network services for any type of intelligent network, e.g., public and private, and subsequently invoked during cooperative call processing of these services.

Cooperative call processing in accordance with the present invention is described in the context of an example that provides the call treatments as outlined in the above confined call processing example exercised across the public intelligent network 101 and the private intelligent network 102. For this example, confined call processing is applied by the public intelligent network 101 up to a point where service logic processing needs to access the user interaction service feature. The user interaction service feature is best (or perhaps can only be) provided by the private intelligent network 102 which obtains information on the final destination for the call. The public domain service logic in element 108 is provided with or has access to service data containing (a) a network identity of service control element 118 in private intelligent network 102, (b) an identifier of the private domain service logic or that offers processing of the requested service feature, and (c) any initial service data required for invocation of the requested service feature.

To initiate cooperative call processing with the private intelligent network 102, service control element 108 establishes an end-to-end communication with service control element 118 using established protocol stack(s) on control connections 131 and 133. For example, control connection 131 may employ a telephony-based signaling system 7 protocol stack for support of an application layer protocol like Intelligent Network Application Protocol (INAP), and control connection 133 may employ a computer industry based signaling protocol stack for support of an application layer protocol like Computer Supported Telecommunications Applications (CSTA). Protocol stack bridge 132 resolves any incompatibilities between protocol stacks supported by the public and private domains.

The established end-to-end communication may be implemented over a direct data link, over a network, over the out-of-band signaling on transport connection 106, etc. What is important is not the specific communications medium but rather that the communications path or connection be from the service control element in one intelligent network (one "end") to the service control element in the other intelligent network (the other "end"). This end-to-end communication may be viewed as a direct logical connection (even though the actual path may in practice not be physically direct) between the service control logic elements of both networks. Using this end-to-end, service logic communications path, the service control logic elements from both networks convey logical operation procedures to support cooperative call processing of the served call. Details of specific, example operation procedures are described further below.

The logical operation procedures include only a relatively small number of operations including: a Start operation, a Continue operation, a Stop operation, and an Event operation. The Start operation is employed by the service logic of one network to request the performance of a specific service feature by the service logic of the other network. The Stop operation is used to logically end what was started. A result of the performed service feature is returned using the Continue operation. The requesting network's service logic may issue a following Continue operation to continue the service feature being performed by the other network's service logic which might include for example monitoring asynchronous Event operations transmitted over the end-to-end communications link.

The logical operation procedures embracing the Start, Continue, Stop, and Event operations are all service applications independent in their mechanism. The operation procedures are realized as a requesting and a serving part that communicate via operational messages on control links 131 and 133 shown in FIG. 1.

The operation procedure specific argument coupled to each operation is arranged into sets of mandatory and optional parameters, holding (a) pre-arranged control data for service logic cooperation and (b) additional pre-arranged variable data fields for service logic processing. The actual amount and nature of data within a specific operation argument is service application dependent and has to be settled when designing application specific cooperative service logic in public and private intelligent networks. All parameters are produced by the requesting part of an applied operation procedure in accordance with the pre-arranged parameters devised for the serving part of that applied operation procedure.

Pre-arranged control data for service logic cooperation convey information for control of the collaboration between requesting and serving service logic. Use of control data is typically necessary for all operation procedures. The Start operation carries control data that allows the access mechanism in the serving service control element to select and launch the requested specific cooperative service logic program. The service logic access mechanism can either be realized as a counterpart to the existing access mechanism used to serve requests from a switching control element in own network or it can be optimized for any other agreed set of control data for the start of cooperative call processing. The Continue, Stop, and Event operations carry control data that include pre-arranged "reason" keys for application continuation, stop, and events. Each reason key determines which pre-arranged service logic branching option the serving part will follow and the amount and nature of any additional variable data included in the applied operation.

Pre-arranged variable data for service logic processing convey information produced by the specific processing instance of requesting service logic and used by the specific processing instance of serving service logic. Use of variable data is typically optional for all operation procedures. Variable data may provide any needed details for cooperative processing of a call, a specific user interaction, and/or a specific chargeable event, etc.

This general description of the operations and their arguments is made specific by the following example definition in Abstract Syntax Notation One (ASN.1) of a Start procedure operational message coupled with an argument that includes control data for the start of cooperative service logic and variable data related to call and billing details. In the example, the Start operation carries control data that allows the serving service control element to select a service logic script based on a unique, pre-arranged script key and up to four additional script attributes. The Start operation can also carry two sets of variable details related to the served call and billing of that call. Each set of variable data is qualified by a pre-arranged data key that settles the amount and nature of up to four call or billing attributes.

Each attribute can be conveyed as either an integer or a number string.

```
start OPERATION
ARGUMENT
      SEQUENCE {
         startScriptinfo      [0]    ControlData,
         startCallinfo        [1]    CallData       OPTIONAL,
         startBillinginfo     [2]    BillingData    OPTIONAL
}
ControlData ::- SEQUENCE {
         ScriptKey            [0]    INTEGER (0 . . . 65535),
         ScriptAttribute      [1]    Attribute      OPTIONAL,
         ScriptAttribute      [2]    Attribute      OPTIONAL,
         ScriptAttribute      [3]    Attribute      OPTIONAL,
         ScriptAttribute      [4]    Attribute      OPTIONAL
}
CallData ::- SEQUENCE {
         CallDataKey          [0]    INTEGER (0 . . . 65535),
         CallAttribute        [1]    Attribute      OPTIONAL,
         CallAttribute        [2]    Attribute      OPTIONAL,
         CallAttribute        [3]    Attribute      OPTIONAL,
         CallAttribute        [4]    Attribute      OPTIONAL
}
BillingData ::- Sequence {
         BillingDataKey       [0]    INTEGER (0 . . . 65535),
         BillingAttribute     [1]    Attribute      OPTIONAL,
         BillingAttribute     [2]    Attribute      OPTIONAL,
         BillingAttribute     [3]    Attribute      OPTIONAL,
         BillingAttribute     [4]    Attribute      OPTIONAL
}
Attribute ::- CHOICE {
         shortinteger         [0]    INTEGER (0 . . . 65535),
         longinteger          [1]    INTEGER (0 . . . 4294967295),
         number               [2]    OCTET STRING (2 . . . 15)
}
```

Establishing a direct logical relationship between the two service control elements of different types of networks in accordance with the present invention is beneficial for a number of reasons. First, service feature requests and results are conveyed at the highest control level in each network from which service features are typically orchestrated. Second, the logical "language" that service control elements from differing networks need to "know" is quite limited, i.e., a handful of operation procedures. Therefore, the logical language minimally impacts data processing overhead while effectively conveying service feature requests and results. Third, there is no need for the service control element of one network to know the specific protocols, language, and operations used by the other network service control element and resources in order to have a particular service request feature performed. All that is necessary is for each network service control element to understand what specific service features are being requested, collect the necessary data attributes for performing that service feature, and return a result which is recognized and usable by the service control element of the requesting network. Fourth, even though the service control elements interact and cooperate at a logical level, the service control elements of each network are not expected to and do not control elements of the other network. This not only simplifies the cooperation interaction but also preserves the integrity of each network's resources and control. If the public intelligent network were for example to temporarily or partially surrender control of its resources to the service control logic of a private intelligent network requesting a particular service feature, the integrity and consistency of the public intelligent network's resources might be jeopardized, e.g., billing records might be changed inconsistently or erroneously.

Returning to the illustrative example, the public network service control element 108 initiates cooperative call processing by transmitting a "Start" procedure over the established service logic communications path to the service control element 118. After the Start procedure is initiated, public network service logic 108 suspends its own processing of the call, but continues any necessary monitoring of billing and connection conditions. The private network service logic 118, invoked by the Start procedure, takes control by processing its initial service feature(s).

In this example, the initial service feature of the specifically requested private network service logic is to provide a user interaction service for the public network originated call. The first task for service control element 118 is to select an appropriate private network resource for user interaction, i.e., one of the service information elements 123, 124 or 126, and to supply the public network service logic 108 with information to allow the public network service logic to direct the switching control element 105 to establish a transport connection via switching control element 116 to that private network user interaction resource. The private network service logic 118 returns the needed information by transmitting a "Continue" operation along with that information to the public network service control element 108 via the established service logic communications path. If the selected resource is contained in service information element 123 or 126, private network service logic 118 may use respective control connections 122 or 130 to pre-load details for the upcoming user interaction processing onto the selected resource before suspending processing.

Public network service logic 108 resumes its call processing as a result of the Continue operation by directing switching control element 108 to connect the incoming call to the indicated destination for user interaction in private intelligent network 102. When switching control element 108 reports the connection is successfully established, the public network service logic launches a Continue operation towards service control element 118 and suspends its call processing. Of course, the Continue operation may convey additional data as an attached argument to the private network service logic 118 if needed for the cooperative call processing.

Both in the controlling and suspended state, public network service logic 108 actively monitors the public network billing and connection conditions for the call. If a change in billing or connection condition is destined to affect suspended or controlled call treatment as processed by the private network service logic 118, the public network service logic 108 may inform the private network service logic 118 by transmitting either an asynchronous "Event" operation or a terminating "Stop" operation to the service control element 118 over the established service logic communications path.

The private network correlation of the incoming call attempt handled by switching control element 116 to the existing service logic processing instance handled by service control element 118 may be accomplished either by the private network switching control element 116 or by the specific service information element (123 or 126) that hosts the pre-selected resource for user interaction. The correlation information is an identifier of the service logic processing instance and is (a) produced by the service control element 118, (b) conveyed to the service control element 108 as an attribute in the Continue operation via the established service logic communications path, (c) included in the instructions for setting up the call from the switching control element 105, and (d) carried in the out-of-band signaling on transport connection 106 towards switching control element 116. For example, the service correlation information for items (c) and (d) may be attached to the destination number of the pre-selected resource as prefixed or suffixed digits.

If service correlation is to be accomplished by the switching control element 116, a trigger condition related to a characteristic part of the modified destination number is configured. This leads to the invocation of a confined call processing private network request procedure to service control element 118 which then accesses the existing service logic processing instance identified by the correlation part of the destination number. The final transport connection from switching control element 116 to the pre-selected resource in a service information element is set up by directions from the service control logic 118.

If the service correlation is to be accomplished by service information element 123 or 126, no trigger condition is configured in switching control element 116 for destination numbers that are modified to embed correlation information. The final transport connection from switching control element 116 to the terminating service information element is set up autonomously by switching control element 116 based on the part of the modified destination number that contains the unmodified destination number. The modified destination number is forwarded in the out-of-band signaling used for setting up transport connections 121 or 127 towards service information element 123 or 126 which then uses prefixed or suffixed correlation digits to close the correlation loop.

If the resource is pre-loaded with information from service control element 118, the correlation loop is closed in the service information element itself. This is because the appropriate control relation between the service information processing instance and service logic processing instance was established during that information pre-load. If the resource is not pre-loaded, a control relation towards the existing service logic processing instance is established by launching a request procedure carrying the correlation digits from the actual service information element to the service control element 118 where the correlation loop is closed.

The public network originated request for initiation of the Continue procedure in the private network arrives at the service control element 118 via control connection 133 before, during, or after the processing of one of the above described alternatives for closing the correlation loop. When the correlation loop is closed and the private network is granted call processing control via the Continue operation, the private network service logic 118 and its instrumentation functions in switching control element 116, service data element 119, and service information elements 123, 124 and 127 accomplish the advanced user interaction with the call party.

From the above example, it is evident that alternating Continue operations from private to public networks and vice versa may be employed advantageously in the design of both public and private network service logic to extend and advance the set of private network service features for user interaction that may be offered to subscribers. In this example, a set of service features for additional billing and connection control is designed and processed in the public network but invoked on demand from the private network service logic 118. Cooperative call processing between the service control elements and resources of each network enables real-time, public network accumulation of additional billing information on request from private network service logic 118 during processing of a value-added user interaction service feature provided by the private network.

Assuming that any additional billing information is passed to a billing record maintained in public network, the final destination for the call is established. The private network service logic 118 initiates a Continue operation to communicate the final destination number and any other completion information to the public network, service control element 108 via the established service logic communications path. The private network is service logic 118 suspends processing of the user interaction service in expectation of a request for processing of the Stop operation. Alternatively, subsequent Event operations related to outgoing call progress information produced in the public network may be processed. A Continue operation for automated fall-back to continued user interaction may be processed when invoked from the public network service control logic 118 if the outgoing call cannot be completed due to, for example, busy or no answer conditions. In the latter case, the user interaction context information from the initial user interaction is still available in the private network and any already collected user profile information may be directly applied in the continued user interaction service.

To complete the description of this cooperative call processing example, the public network service control element 108 directs the public network switching control element 105 to establish an outgoing call on transport connection 114 towards the final destination, i.e., telephone terminal 115. The public network service logic 108 now generates the Stop operation which is conveyed to the service control element 118 and closes the established service logic communications path initially established with service control element 118 to initiate cooperative call processing of the incoming call. Following the Stop procedure, the service logic processing instances generated during the cooperative call processing may be used in confined call processing within each of the networks. In this example, confined call processing in the public network includes releasing transport connection 106, connecting the incoming and outgoing calls in switching control element 105, and measuring and monitoring call duration charges. The confined call processing phase in the private network includes freeing free up all occupied instrumentation functions, releasing internal transport connections to resources in service information elements 123, 124 and/or 126, and creating a statistics and performance record on Service Data element 119 for the fully accomplished user interaction.

In contrast to the confined call processing approach earlier described, the cooperative call processing exercised across public intelligent network 101 and private intelligent network 102 requires only one billing record and occupies two circuits in switching control element 105. For the duration of the call between telephone terminals 104 and 115, the billing post-processing system receives both total call duration charges and total additional charges in the single billing record. No device or processing power remains seized in private intelligent network 102 following the private network processed user interaction.

Cooperative call processing across public and private intelligent networks employs similar operation procedures for handling calls or other service requests that originate in the private network, i.e., the private network service control element 118 requests a service from the public network using the Start, Continue, Event, and Stop operation procedures described over an established service logic communications path between both service control elements 118. Accordingly, both service control elements 108 and 118 perform dual client-type and server-type functions. The symmetric duality of the operation procedures provides the foundation for the design and execution of numerous advanced call processing services as will be appreciated by those of skill in the art.

A significant advantage of the invention is that service features designed and processed within one intelligent network may be offered as additional features in the design and processing of services triggered in another type intelligent network. This enormous flexibility is accomplished without jeopardizing the integrity of either network. Authorization and authentication rules for cooperation requests may be followed by both the requesting and serving service control elements using the described operation procedures for cooperative call processing, i.e., Start, Continue, Event, and Stop. If authorization and authentication handling rules are instituted between network service control elements, one practical advantage of the invention is that a serving network may establish usage fee records to be settled with the requesting network in addition to (or as full or partial replacement of) the usage fees to be settled with call parties themselves.

Another significant advantage of the invention is that only the general operation procedures are shared over the control connections between public and private intelligent networks. Accordingly, a requesting network does not need to access or invoke internal operation procedures of a serving network and vice versa. Stated another way, the public and private networks do not have to know and use the "active language" of the other. Instead, each network need only request and provide services from/to the other network using the relatively small "shared" set of commonly understood operation procedures. The shared operation procedures are preferably (though not necessarily) implemented presumably as a set of new service independent building blocks (sometimes called "SIBs") that may be applied in concert with other existing reusable functional actions used to design and process service applications in public and private intelligent networks.

Figure 2:
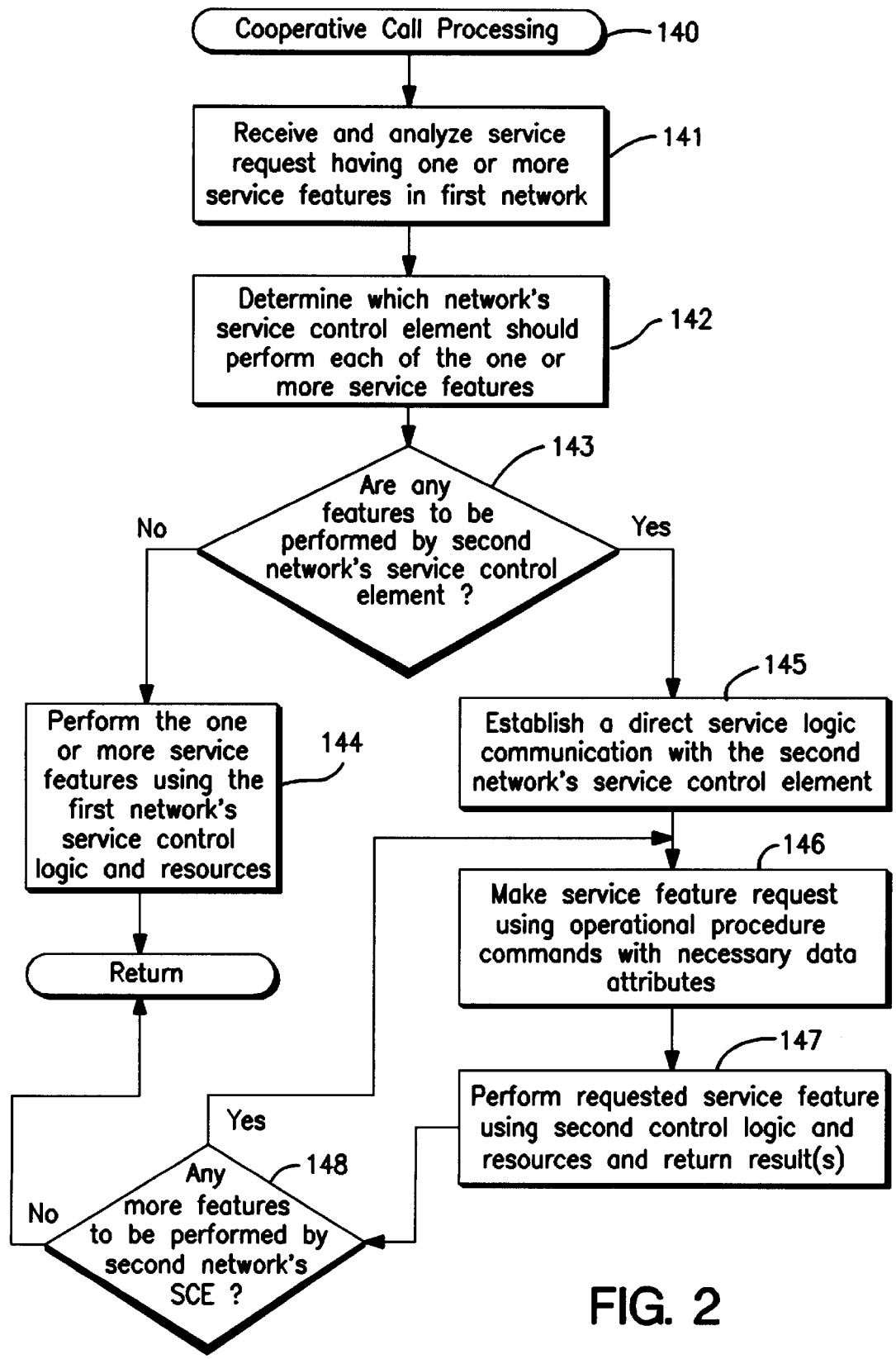
FIG. 2 is a flowchart diagram illustrating an overall service request analysis and rendering routine 140 in accordance with an example, non-limiting embodiment of the present invention.

A general description of the basic cooperative call processing procedures will now be described in conjunction with the flowchart diagram 140 illustrated in FIG. 2. Initially, a service request is received (block 141) having one or more service features and analyzed by the service control element of the network receiving the call request (labelled the first network for convenience). That service control element determines which of the cooperating networks'service control elements should perform each of the one or more requested service features (block 142). A decision is made (block 143) by the first network's service control element whether there are any service features to be performed by the other, second network's service control element. If not, the first network service control element performs the one or more service features using the first network's service control logic and resources (block 144), i.e., a confirm call processing.

Otherwise, control proceeds to block 145 where the first network's service control element establishes a direct service logic communication with the second network's service control element. The first network service control element makes a service feature request using the operational procedures described above with the necessary arguments and data attributes (block 146). The second network's service control element performs the requested service feature using the appropriate service control logic and resources and returns one or more results to the first network service control element via the established direct service logic communications path (block 147). A decision is made (block 148) whether there are any more service features to be performed by the second network's service control element. If so, control returns to block 146.

Figure 3:
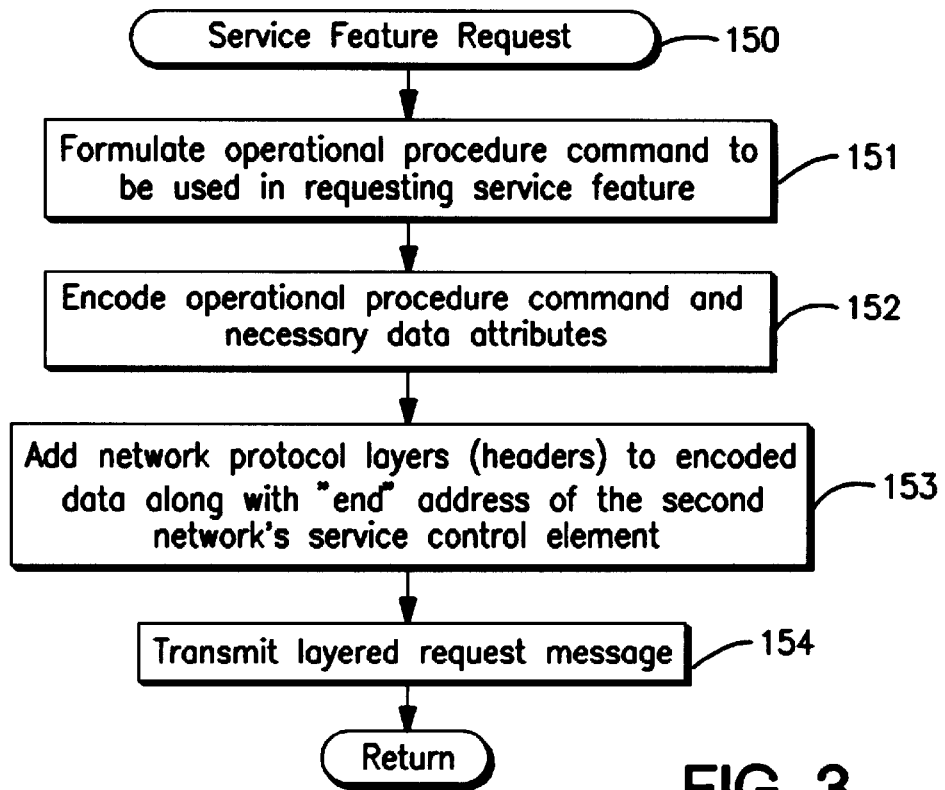
FIG. 3 is a flowchart diagram illustrating a service feature request procedure 150 in accordance with an example, non-limiting embodiment of the present invention.

Specific example procedures for performing a service feature request are now described in conjunction with the flowchart routine 150 illustrated in FIG. 3. The first requesting network's service control logic formulates an operational procedure, i.e., a Start command, to be used in requesting the service feature along with a specific argument for the Start command corresponding to the specifically requested service feature (block 151). The first service control logic encodes the operational procedure, argument, and any necessary data attributes (block 152). The necessary protocol layers used in the first network are then added to the encoded data along with an end address of the first network's service control element (block 153). The layered request message is then transmitted over the established service logic communications path between the first and second network service control elements (block 154).

Figure 4:
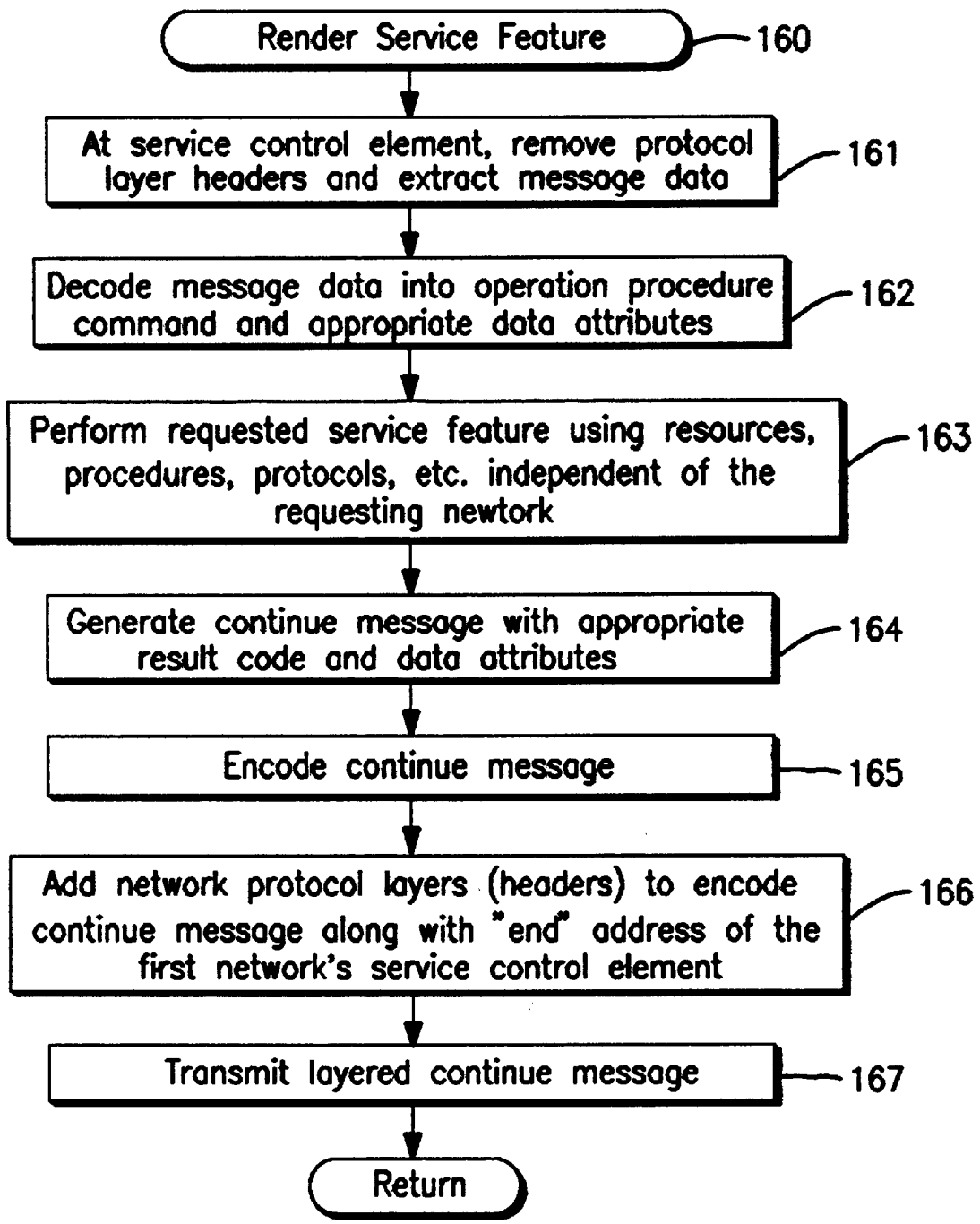
FIG. 4 is a flowchart diagram illustrating a service rendering procedure 160 in accordance with an example, non-limiting embodiment of the present invention.

Example procedures for rendering a requested service feature (block 160) will now be described in conjunction with the flowchart illustrated in FIG. 4. Upon receipt of the transmitted request message by the second network's service control element, the protocol layer headers are removed and the underlying message data extracted (block 161). The message data is decoded to extract the operation procedure, the specific service feature argument, and the accompanying data attributes (block 162). The second network service control element performs the requested service feature using resources, procedures, protocols, etc. within the second network independent of the control or knowledge of the requesting first network service control element (block 163). The second network service control element then generates a Continue message having an appropriate result code and accompanying data attributes (block 164). The Continue message is encoded using for example ASN.1 syntax (block 165), and the necessary network protocol layers of the second network are added to the encoded message result along with the end address of the first network's service control element (block 166). The Continue message is then transmitted to the first network's service control element over the established service logic communications path.

Figure 5:
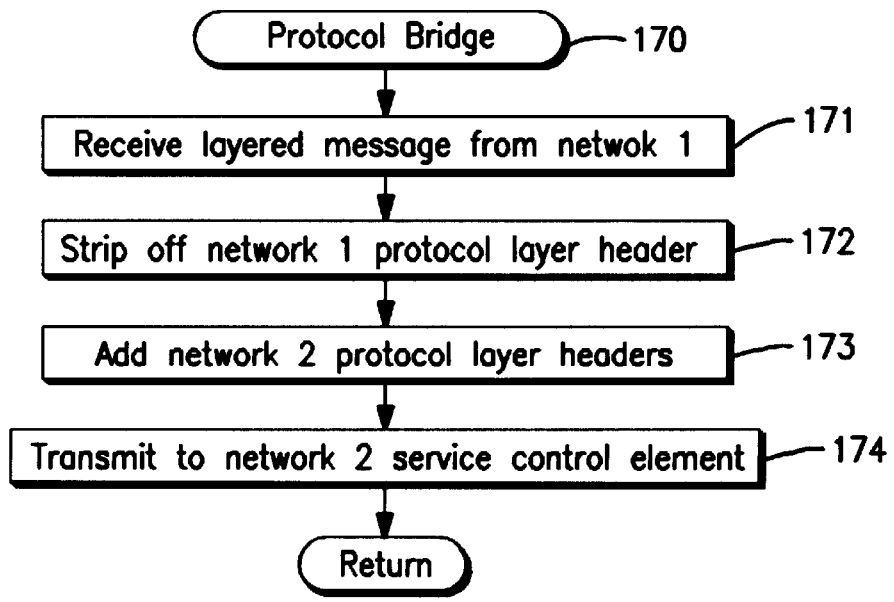
FIG. 5 is a flowchart diagram illustrating a protocol bridge procedure 170 that may be employed in accordance with an example, non-limiting embodiment of the present invention.

As mentioned above, if the protocols of the first and second network are different, as they typically are in public and private intelligent networks, the present invention provides a protocol conversion bridge 132 shown in FIG. 1 which may be implemented using the procedures outlined in routine 170 illustrated in FIG. 5. It is assumed that the protocol conversion bridge is configured for mapping of network address formats between the two networks. A protocol layer message from the first network is received at the protocol bridge 132 (block 171). The first network protocol layer headers are stripped off (block 172), and the second network protocol layer headers are successively added to the underlying message information (block 173). The "re-layered" message is then transmitted to the second network service control element (block 174).

Figure 6:
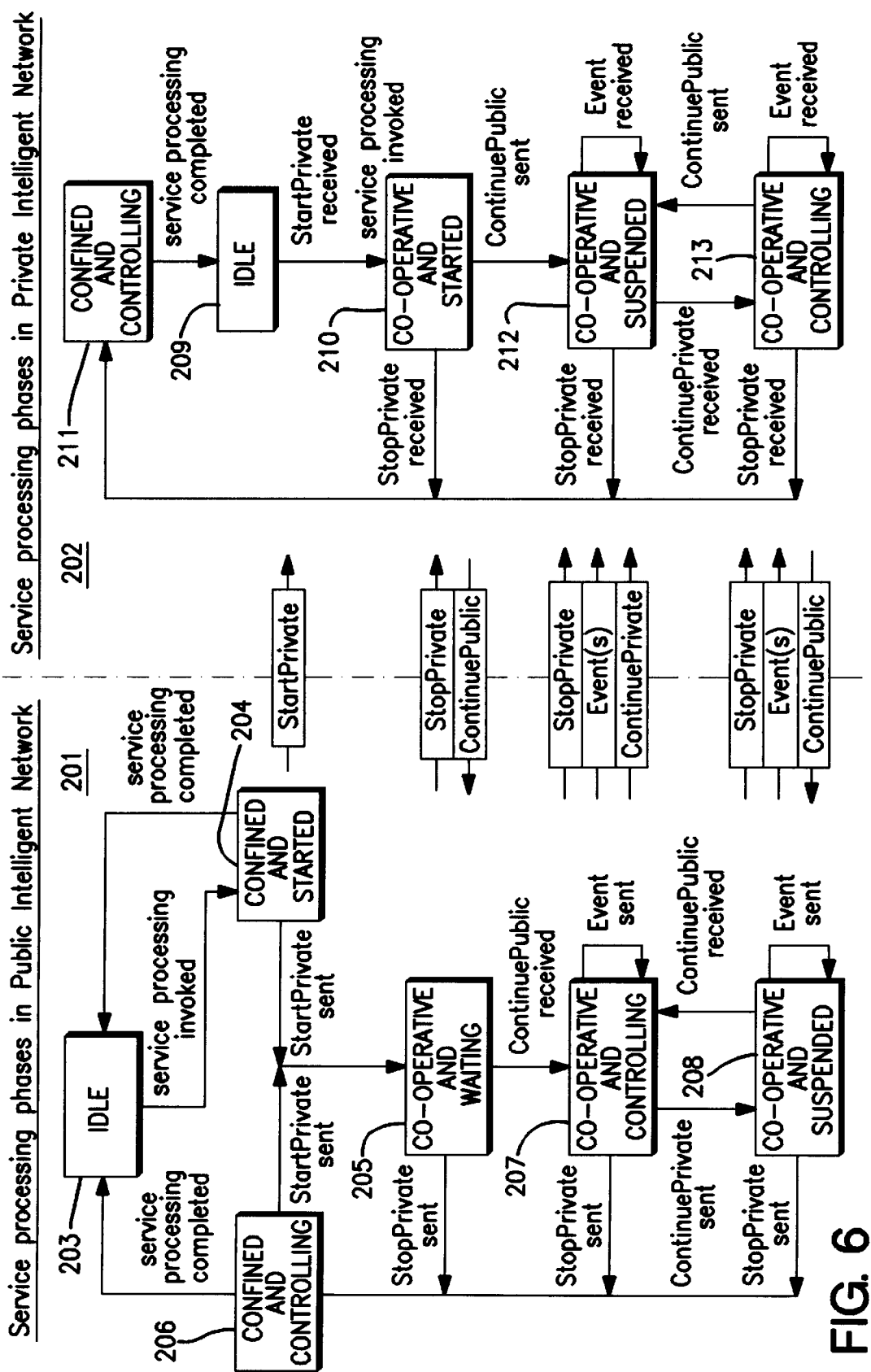
FIG. 6 is a flowchart illustrating service processing phases before, during, and after cooperative call treatment initiated from a public intelligent network to a private intelligent network in accordance with an example, non-limiting embodiment of the present invention.
Figure 7:
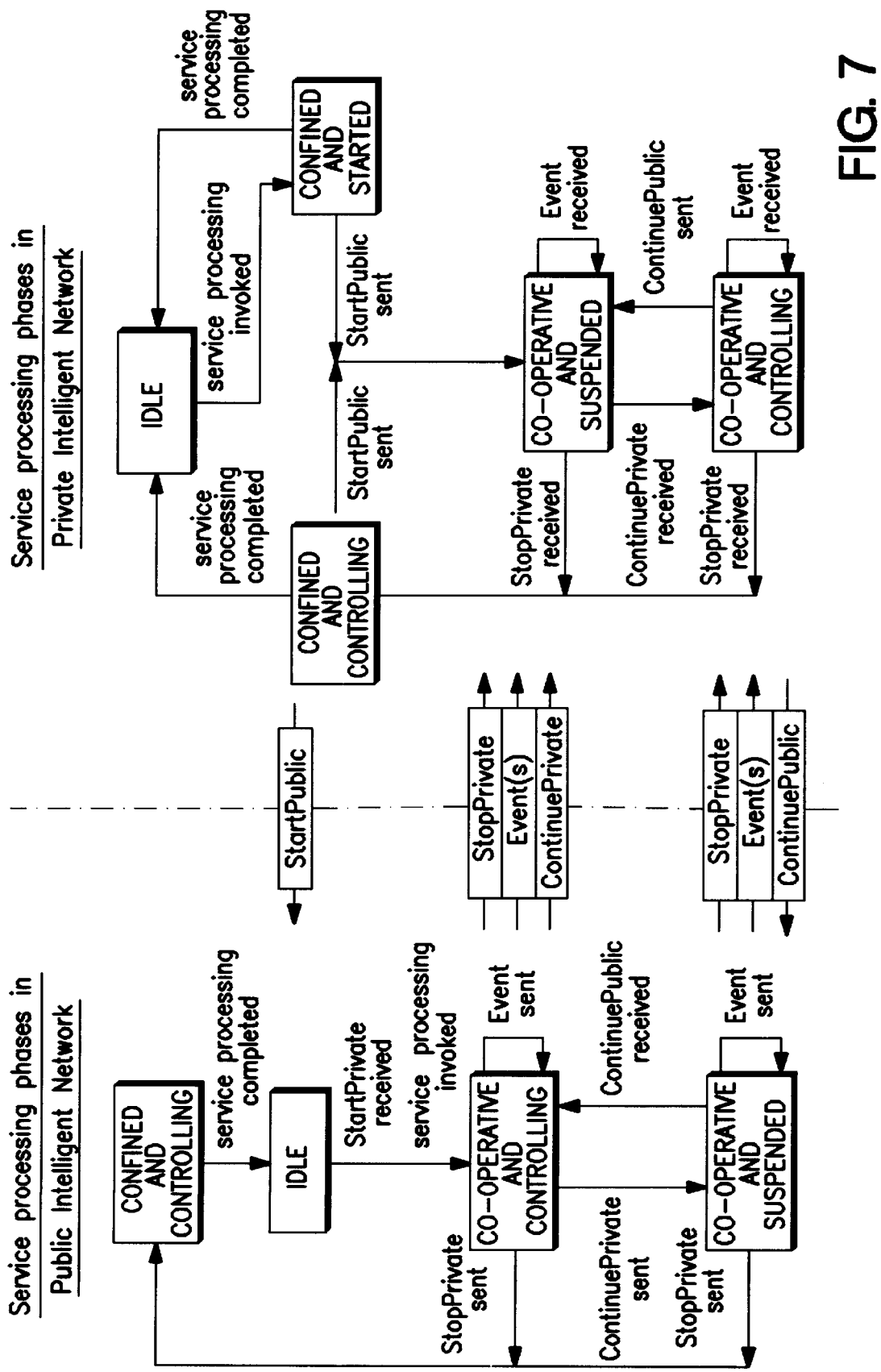
FIG. 7 is a flowchart illustrating service processing phases before, during, and after cooperative call treatment initiated from a private intelligent network towards a public intelligent network in accordance with an example, non-limiting embodiment of the present invention.

FIGS. 6 and 7 are flowcharts that illustrate intelligent network service processing phases for call processing incorporating the above-described operation procedures for cooperative call processing. FIG. 6 illustrates cooperative call processing initiated from a public intelligent network towards a private intelligent network. FIG. 7 illustrates cooperative call processing initiated from a private intelligent network towards a public intelligent network. In both FIGS. 6 and 7, the two networks are separated by a dot-dashed line. Solid boxes on the dot-dashed line represent messages relaying operation procedure requests across the network boundary over an established service logic communications connection. Solid boxes within each network represent service processing phases. Solid single-ended arrows depict transitions between those phases.

Referring to FIG. 6, the processing of a call attempt in the switching control element 105 in the public intelligent network 201 triggers the service control element 108 to invoke service logic. As a result, the public network service processing moves from an IDLE state (block 203) to a CONFINED AND STARTED state (block 204).

The CONFINED AND STARTED state 204 supports conventional operation procedures for confined call processing within the public intelligent network 201 but also advantageously permits start of cooperative call processing. The public network service processing leaves state 204 either when public network service processing is completed returning to IDLE state 203 or when the public network service control element 108 invokes a Start procedure by sending a "StartPrivate" message to the private intelligent network 202 via the established service logic communications connection. The public network service control logic then enters a COOPERATIVE AND WAITING state 205 in this latter case to support public network processing of conventional operation procedures, e.g., monitoring of billing and connection conditions, and processing of the cooperative call processing operation procedures "Continue" and "Stop." Public network service processing leaves state 205 when a change in a monitored billing or connection condition demands that the Stop procedure command be invoked by sending a "StopPrivate" message to the private intelligent network 202 over the established service logic communications path and enters a CONFINED AND CONTROLLING state 206. When the private network service control logic invokes the Continue procedure by sending a ContinuePublic message to the public intelligent network 201, the private network service logic enters a COOPERATIVE AND CONTROLLING state 207.

The CONFINED AND CONTROLLING state 206 supports public network service logic confined call processing within public intelligent network 201 along with public network service processing of the Start operation procedure for cooperative call processing. Public network service processing leaves CONFINED AND CONTROLLING state 206 when public network service processing is complete and returns to IDLE state 203. In addition, public network service processing leaves CONFINED AND CONTROLLING state 206 when public network service processing invokes the Start procedure by sending a StartPrivate message to the private intelligent network 202 and moving to COOPERATIVE AND WAITING state 205.

The COOPERATIVE AND CONTROLLING phase 207 supports public network service confined call processing within public intelligent network 201 including monitoring of billing and connection conditions plus public network service processing of cooperative call processing operation procedures Continue and Stop. Phase 207 also supports the public network service control logic reporting events using the Event operation procedure involved towards the private intelligent network 202. The public network service processing remains in phase 207 when a service processing condition or a change in a monitored billing or connection condition requires that an Event message be sent to the private intelligent network 202. Public network service processing leaves phase 207 when a change in service, billing, or connection condition requires invoking a Stop operation procedure by sending a StopPrivate message over the established service logic link and therefore entering the CONFINED AND CONTROLLING phase 206. Public network service processing also leaves phase 207 when the public network service processing transmits a ContinuePrivate message to the private intelligent network 202, and thereafter, enters a COOPERATIVE AND SUSPENDED phase 208.

COOPERATIVE AND SUSPENDED phase 208 supports public network service processing of billing and connection conditions as well as processing of the cooperative call processing operation procedures Continue and Stop. Phase 208 also supports public network service processing of the Event reporting operation procedure to the private intelligent network 202. Public network service processing stays in phase 208 when a change in a monitored billing or connection condition requires transmitting an Event procedure message to the private intelligent network 202. Public network service processing leaves phase 208 when a change in a monitored billing or connection condition requires transmitting a Stop procedure command (a StopPrivate message) to the private intelligent network 202 and thereafter entering a CONFINED AND CONTROLLING phase 206. Public network service processing also leaves phase 208 when the private network service processing invokes a Continue procedure (by ContinuePublic message) to the public intelligent network 201 and thereafter entering COOPERATIVE AND CONTROLLING phase 207.

The established service logic communications path between the service control element in public intelligent network 201 and the service control element in private intelligent network 202 allows reception of a StartPrivate message in the private network service control element to trigger private network service processing. As a result, private network service processing moves from IDLE 209 to COOPERATIVE AND STARTED 210.

COOPERATIVE AND STARTED phase 210 supports private network service confined call processing within the private intelligent network 202 plus private network service cooperative call processing using the operation procedures Continue and Stop. Private network service processing leaves phase 210 when public network service processing transmits a StopPrivate message to the private intelligent network 202, and thereafter enters a CONFINED AND CONTROLLING phase 211. Private network service processing also leaves phase 210 when private network service processing transmits the ContinuePublic message to the public intelligent network 201, and thereafter enters a COOPERATIVE AND SUSPENDED phase 212.

CONFINED AND CONTROLLING phase 211 supports private network service confined call processing within private intelligent network 202. Private network service processing leaves phase 211 when private network service processing is completed and enters IDLE phase 209.

The COOPERATIVE AND SUSPENDED phase 212 supports private network service cooperative call processing of the operation procedures Continue, Stop, and Event(s). Private network service processing remains in phase 212 when public network service processing transmits an Event message to the private intelligent network 202. Private network service processing leaves phase 212 when public network service processing transmits a StopPrivate message to the private intelligent network 202 and thereafter enters a CONFINED AND CONTROLLING phase 211. In addition, private network service processing leaves phase 212 when public network service processing transmits a ContinuePrivate message to the private intelligent network 202 and thereafter enters a COOPERATIVE AND CONTROLLING phase 213.

The COOPERATIVE AND CONTROLLING phase 213 supports private network service confined call processing within private intelligent network 202 along with private network service processing of cooperative call processing operation procedures Continue, Stop, and Event(s). Private network service processing stays in phase 213 when public network service processing transmits an Event message to the private intelligent network 202. Private network service processing leaves phase 213 when public network service processing transmits a StopPrivate message to the private intelligent network 202 and thereafter enters a CONFINED AND CONTROLLING phase 211. In addition, private network service processing leaves phase 213 when private network service processing transmits a ContinuePublic message to the public intelligent network 201 and thereafter enters a COOPERATIVE AND SUSPENDED phase 212.

FIG. 7 illustrates example intelligent network service processing phases when cooperative call processing is initiated from a private intelligent network towards a public intelligent network. FIG. 7 is an almost mirrored version of the flow illustrated in and described for FIG. 6. The only differences are (a) use of message StartPublic instead of message StartPrivate for invoking the Start procedure and (b) the absence of the two service processing phases COOPERATIVE AND WAITING and COOPERATIVE AND STARTED. The latter difference is caused if there is a non-symmetrical handling of event procedures. However, if Event procedures requested by private network service processing and served by public network service processing are introduced in the two service processing phases COOPERATIVE AND CONTROLLING and COOPERATIVE AND SUSPENDED, the flowcharts would be fully mirrored. Accordingly, a detailed understanding of FIG. 7 is evident from the detailed description of FIG. 6.

Accordingly, cooperative call processing provides many advantages, some of which have been explained above. Combining the service capabilities of two different types of networks will likely also produce synergistic benefits. Those of skill in the art will therefore appreciate the numerous advanced call processing services that may be achieved by the cooperative call processing method and arrangement of the present invention.

While the foregoing describes what are considered to be preferred example embodiments of the invention, it is understood that various modifications may be made therein and that the invention may be implemented in various forms and embodiments, and that it may be applied in numerous applications, only some of which have been described. The following claims are intended to cover all such modifications and variations which fall within the true scope of the invention.

What is claimed is:

1. In a communications environment including a first telecommunications network and a second, different type of telecommunications network, each network having its own service control element including service control logic, switching control element, and service data element with the first and second network switching control elements having an in-band and out-of-band transport connection therebetween, a method for processing a requested service having plural service features comprising the steps of:
   establishing a communication between the first and second service control elements;
   providing the first and second service control elements with a common set of operation procedures; and
   one of the first and second service control elements requesting, using the common set of operation procedures commands over the established communication, that at least one of the service features be performed by the other service control element.

2. The method in claim 1, wherein the operation procedures include a Start operation coupled with a specific service feature start argument which when transmitted by the one service control element over the established end-to-end communication causes the other service control element to perform the requested service feature and returns a Continue operation coupled with a specific service feature Result argument to the one service control element over the established end-to-end communication.

3. The method in claim 2, wherein after the specific service feature result is provided to the one service control element, the method further comprises:
   determining if further servicing is needed and supported by the other service control element to provide the requested service feature;
   if not, the one service control element sends a Stop operation to the other service control logic and continues processing the requested service; and
   if so, the one service control element processes any service logic needed to establish a pre-condition for continued processing by the other service control element and sends a Continue operation to the other service control element to continue the service feature processing by the other service control element.

4. The method in claim 3, wherein the operation procedures include an Event operation for transmitting from the one service control logic one or more events that the other service control element is to take into account when providing the requested service feature.

5. The method in claim 1, wherein the established end-to-end communication is accomplished by a direct data link or over a signaling network.

6. The method in claim 1, wherein the service feature request is performed by the other service control element without the one service control element having control or knowledge of how the other service control element performs the requested service feature.

7. The method in claim 1, wherein the service feature request may be made without a telecommunications call having been received at either the first or second intelligent networks.

8. The method in claim 1, further comprising:
   receiving a telecommunications call in the one intelligent network including the requested service;
   the one service control element identifying the service features to be performed in order to fulfill to the call's requested service; and
   determining which of the first and second intelligent networks is to perform each of the identified service features.

9. The method in claim 1, further comprising:
   receiving a telecommunications call at the first switching control element requesting the service including a first and a second service feature, and
   processing the requested telecommunications call service including:
      providing the first service feature using the first service control element, and
      providing the second service feature using the second service control element,
   wherein the first and second service control elements cooperatively provide the first and second service features by communicating over the established communication.

10. The method in claim 9, wherein a communication between the first and second service control elements is asynchronous.

11. The method in claim 1, wherein the first telecommunications network is a public intelligent network and the second telecommunications network is a private intelligent network.

12. A method comprising:

logically integrating a first set of call services from a public telecommunications network oriented towards a first protocol with a second different set of call services from a private telecommunications network oriented towards a second protocol different from the first protocol including establishing a communication between the public network service logic and the private network service logic, and upon receiving a telecommunications call in one of the public and private telecommunications networks for a call processing service having plural service features, the public network service logic and the private network service logic cooperatively performing the plural service features using one call service from the first set of call services from the public telecommunications network and another call service from the second different set of call services from the private telecommunications network not included in the first set of call services.

13. The method in claim 12, wherein the public network service logic and the private network service logic interact with each other during the cooperatively performing step.

14. The method in claim 12, further comprising:

providing the public network service logic and the private network service logic with a common set of operation procedures, wherein the cooperatively performing step includes the public network service logic and the private network service logic using the operation procedures transferred over the established communication.

15. The method in claim 12, wherein one of the public network service logic and the private network service logic requests that the other perform one of the plural service features without the one network's service logic having control or knowledge of how the other network's service logic performs the requested service feature.

16. The method in claim 12, wherein the cooperatively performing step includes:

determining, using one of the public network's service logic and the private network's service logic, which network's service logic should perform each of the plural service features, and for a service feature to be performed using the other network's service logic, requesting, over the established communication, the other network's service logic to perform the service feature using a Start operation, a specific service start argument, and corresponding data attributes for that specific service Start argument.

17. The method in claim 16, wherein the cooperatively performing step further includes:

the other network's service control logic performing the requested service feature based on the received operation, the specific service start argument, and the corresponding data attributes using the resources in the other network and the protocol for which the other network is oriented, and returning a Continue operation coupled with a specific service feature result argument to the one network's control network over the established communication.

18. The method in claim 16, wherein after the result is returned to the one network's service logic, the method further comprises:

determining if a further service feature is to be performed by the other network's service logic;

if not, the one network's service logic sends a Stop operation to the other network's service logic; and if so, the one network's service logic processes any service feature(s) needed to establish a pre-condition for continued processing by the other network's service logic and sends a Continue operation to the other network's service logic to continue service feature processing by the other network's service logic.

19. The method in claim 18, wherein the operation procedures include an Event operation for transmitting one or more events that the other network's service logic is to take into account when providing the requested service feature.

20. A system for providing call processing services, comprising:

a first intelligent communications network having a first service control element including service control logic, a first switching control element, and a first service data element;

a second, different type of intelligent communications network having a second service control element including service control logic, a second switching control element, and a second service data element;

a transport path between with the first and second network switching control elements carrying in-band signals;

a set of operation procedures common to the first and second service control elements;

a communications path for transmitting operation procedures directly to and from the first and second service control elements; and wherein the first and second service control elements use ones of the common set of operation procedures transmitted over the communications path to cooperatively perform a requested service using resources from both the first and second communications networks.

21. The system in claim 20, wherein the requested service includes plural service features, and wherein the operation procedures include a Start operation coupled with a specific service start request argument and corresponding data, which when transmitted by the first service control element over the communications path to the second service control element, causes the second service control element to perform the requested service feature and return a Continue operation coupled with a specific service feature result argument to the first service control element over the communications path.

22. The system in claim 21, wherein after the specific service feature result is provided to the first service control element, the first service control element determines if further servicing is needed, and if not, the first service control element sends a Stop operation to the second service control logic, and if so, the first service control element processes any service logic needed to establish a precondition for continued processing by the other service control element and sends a Continue operation to the second service control logic to continue service feature processing by the second service control element.

23. The system in claim 22, wherein the operation procedures include an Event operation for transmitting one or more events that the second service control element is to take into account when providing the requested service feature.

24. The system in claim 22, wherein the communications path is accomplished by a direct data link or over a signaling network.

25. The system in claim 20, wherein the first service control element does not control how the second service control element performs the requested service feature.

26. The system in claim 20, wherein the service feature request may be made without a telecommunications call having been received at either the first or second intelligent communications networks.

27. The system in claim 20, wherein in response to a service request by a telecommunications call received in the first intelligent networks, the first service control element identifies one or more service features to be performed in order to fulfill to the call service request and determines which of the first and second intelligent networks is to perform each of the identified service features.

28. The system in claim 20, wherein the first and second communications networks employ first and second different communications protocols, respectively, the system further comprising:
 a protocol bridge incorporated in the communications path converting between the first and second different communications protocols when communications are passed between the first and second service control elements over the communications path.

29. An integrated communications services system, comprising:
 a public intelligent network oriented towards a first protocol and providing a first set of services;
 a private intelligent network oriented towards a second protocol different from the first protocol and providing a second different set of services;
 a communications path between service logic in the public intelligent network and service logic in the private intelligent network; and
 a set of operation procedures used by both the public intelligent network service logic and the private intelligent network service logic to interact at a logical operation level such that when a telecommunications call is received in one of the networks requesting a call processing service having plural service features, the public intelligent network service logic and the private intelligent network service logic cooperatively perform the requested plural service features using the set of operation procedures transmitted over the communications path.

30. The system in claim 29, wherein one of the public intelligent network service logic and the private intelligent network service logic requests the other perform one of the plural service features without the one network's service logic controlling how the other network's service logic performs the requested service feature.

31. The system in claim 29, wherein one of the network's service logic determines which of the public intelligent network's service logic and the private intelligent network's service logic is to perform each of the plural service features, and for a service feature to be performed using the other network's service logic, the one network's service logic directly requests over the communications path the other network's service logic to perform the service feature using a Start operational, coupled with a specific service start argument and corresponding data attributes.

32. The system in claim 31, the set of operation procedures further includes a Stop operation, a Continue operation, and an Event operation.

33. The system in claim 29, further comprising:
 a protocol bridge incorporated in the communications path for converting between the first and second different communications protocols when communications are passed between the first and second service control elements over the communications path.

* * * * *